United States Patent
Jiang et al.

(10) Patent No.: US 7,914,644 B2
(45) Date of Patent: Mar. 29, 2011

(54) METHOD FOR MOUNTING PROTECTIVE FILM ONTO GLASS

(75) Inventors: Ying-Chang Jiang, Shenzhen (CN);
Chia-Hsing Chang, Taipei Hsien (TW);
Ling-Dong Xiang, Shenzhen (CN)

(73) Assignees: Shenzhen Futaihong Precision Industry Co., Ltd., ShenZhen, Guangdong Province (CN); FIH (Hong Kong) Limited, Kowloon (HK)

(*) Notice: Subject to any disclaimer, the term of this patent is extended or adjusted under 35 U.S.C. 154(b) by 715 days.

(21) Appl. No.: 11/947,094

(22) Filed: Nov. 29, 2007

(65) Prior Publication Data
US 2009/0047415 A1 Feb. 19, 2009

(30) Foreign Application Priority Data
Aug. 17, 2007 (CN) .......................... 2007 1 0076409

(51) Int. Cl.
*C04B 37/00* (2006.01)
*C23C 16/52* (2006.01)
(52) U.S. Cl. .......................................... 156/325; 427/8
(58) Field of Classification Search ................. 156/325; 427/8
See application file for complete search history.

(56) References Cited

U.S. PATENT DOCUMENTS
2002/0122925 A1* 9/2002 Liu et al. ........................ 428/212
2006/0151085 A1* 7/2006 Habisreitinger et al. ....... 156/54
* cited by examiner

*Primary Examiner* — Philip C Tucker
*Assistant Examiner* — Michael N Orlando
(74) *Attorney, Agent, or Firm* — Jeffrey T. Knapp

(57) ABSTRACT

A method for mounting a protective film (11) on a screen (13) comprises these steps: providing a protective film and a screen having shape and area approximately equal to that of the protective film; holding the screen; aligning the protective film with the screen; and mounting the protective film on the screen.

9 Claims, 5 Drawing Sheets

METHOD FOR MOUNTING PROTECTIVE FILM ONTO GLASS

BACKGROUND OF THE INVENTION

1. Field of the Invention

The present invention generally relates to methods for mounting protective films onto screens, particularly to a method for mounting a protective film onto a screen without causing wrinkles.

2. Description of Related Art

Nowadays, portable electronic devices, such as mobile phones, laptops and personal digital assistants (PDAs) are widely used. Most of these portable electronic devices contain screens made of glass or hard plastics. However, the aforementioned materials are fragile, which may typically shatters into many pieces upon an impacted with an object, and the broken pieces may sputter and damage the nearby persons.

Protecting film is widely used to prevent the broken screens from sputtering. The protecting film is mounted on the screens via glue. If a screen is broken into pieces, the protecting film mounting thereon will keep the broken pieces in place, thus prevented it from shattering.

A typical method for mounting the protective film onto the screen comprises two main steps: mounting a piece of protective film having an area larger than that of a screen onto the screen; and cutting off a redundant portion of the protective film.

However, in the typical mounting method, the shearing force caused by the cutting step is prone to cause wrinkles generated on the mounted protective film. Furthermore, the cut portion of the protective film is wasted.

Therefore, a new method for mounting protective film onto screen is desired in order to overcome the above-described shortcomings.

SUMMARY OF THE INVENTION

In one embodiment thereof, a method for mounting a protective film on a screen comprises these steps: providing a protective film and a screen having shape and size approximately equal to that of the protective film; holding the screen; aligning the protective film with the screen; and mounting the protective film on the screen.

Other novel features will become more apparent from the following detailed description when taken in conjunction with the accompanying drawings.

BRIEF DESCRIPTION OF THE DRAWINGS

Many aspects of the method for mounting protective film onto screen can be better understood with reference to the following drawings. The components in the drawings are not necessarily drawn to scale, the emphasis instead being placed upon clearly illustrating the principles of the method for mounting protective film onto screen. Moreover, in the drawings, like reference numerals designate corresponding parts throughout the several views.

DETAILED DESCRIPTION OF THE INVENTION

Figure 5:
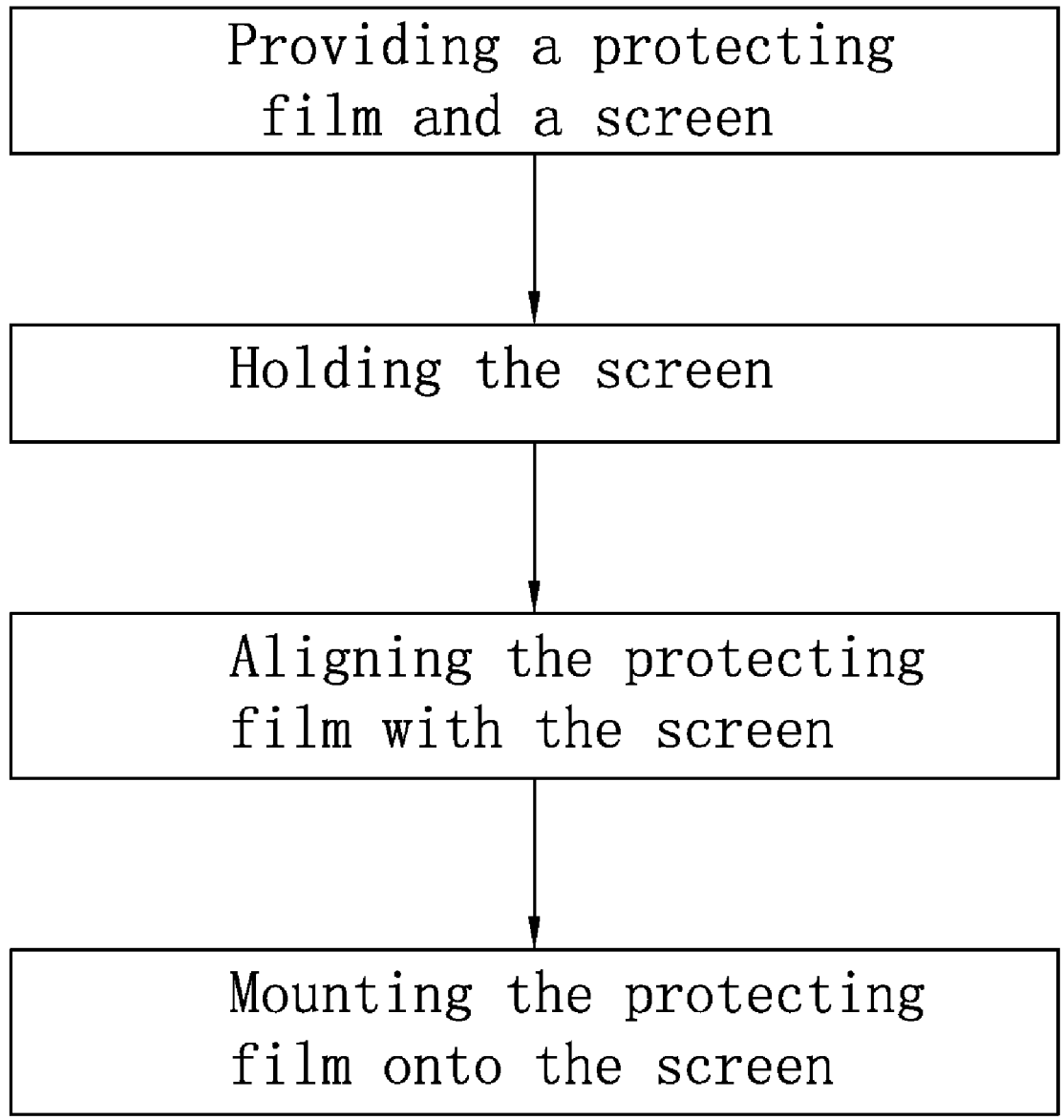
FIG. 5 is a flow chart of the method of the present embodiment.

Referring to FIG. 5, a method in accordance with a present embodiment for mounting a protective film onto a screen of a portable electronic device, such as a mobile phone or a laptop, is provided. The method includes these steps as follows.

Figure 1:
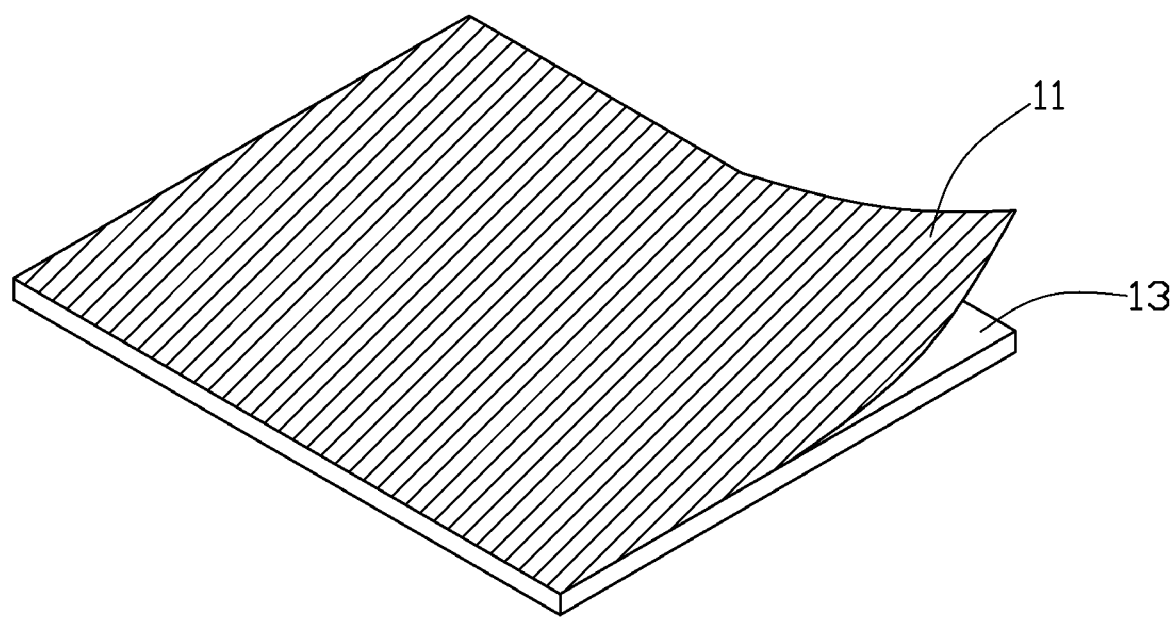
FIG. 1 is a schematic view of a protective film mounted onto a screen in accordance with the method of the present embodiment.
Figure 2:
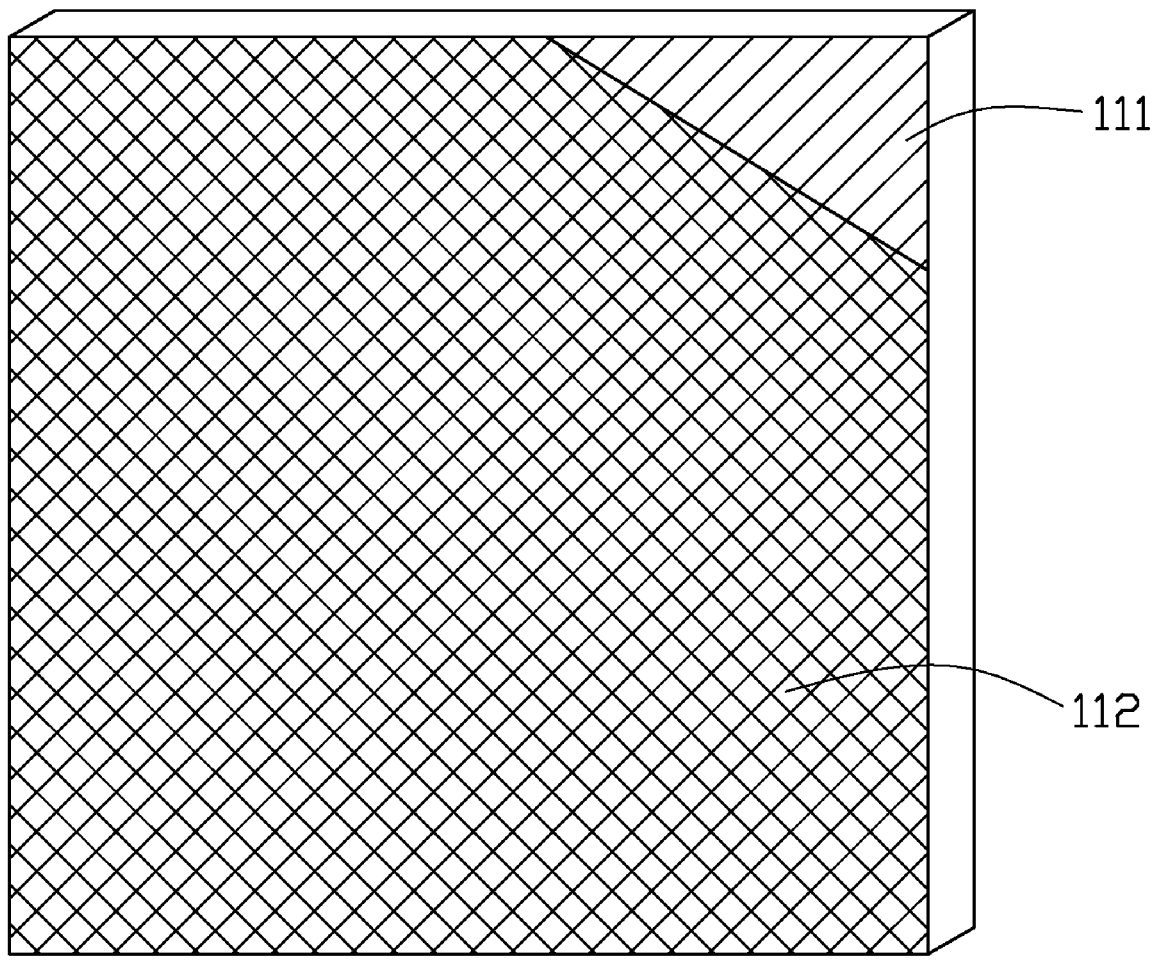
FIG. 2 is an enlarged view of a portion of the protective film shown in FIG. 1.

First, a protective film 11 and a screen 13 are provided. Referring to FIG. 1 and FIG. 2, the protective film 11 includes a base layer 111 and a gluing layer 112 spreading on the base layer 111. The base layer 111 is made of plastics such as polyethylene terephthalate (PET). The gluing layer 112 is made of glue such as acrylate. The screen 13 is made of transparent materials, such as glass or plastic, etc. The shape and size of the screen 13 are approximately equal to that of the protective film 11.

Figure 3:
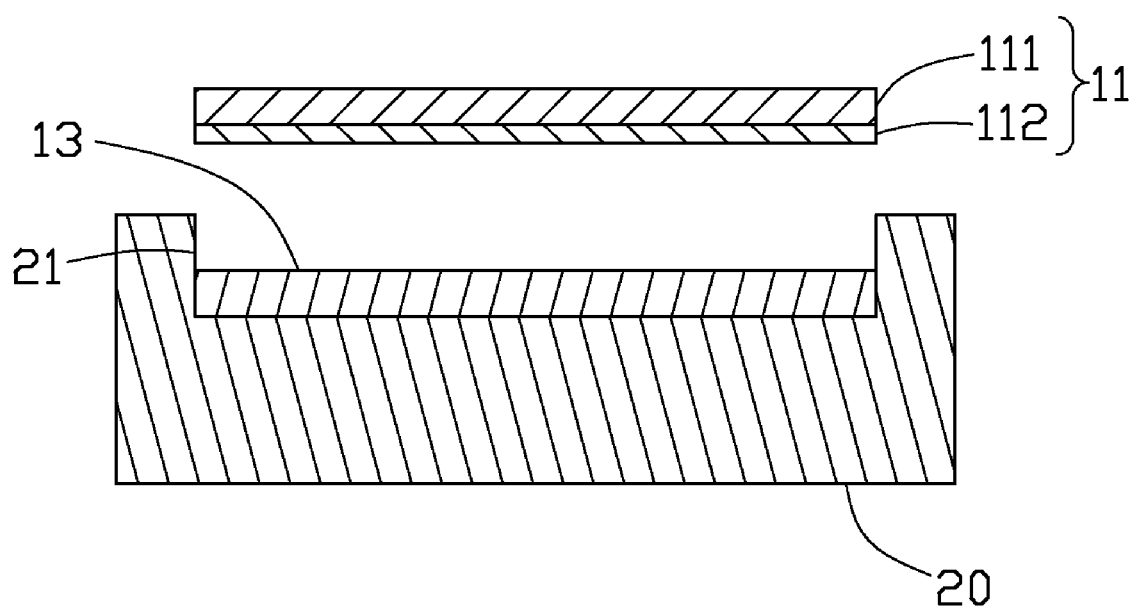
FIG. 3 is a schematic view of mounting the protective film shown in FIG. 1 onto the screen held in a fixture in accordance with the method of the present embodiment.

Second, a fixture 20 for holding the screen 13 is provided. Also referring to FIG. 3, the fixture 20 defines a recess 21 corresponding to the screen 13 therein, and the screen 13 is held in the recess 21.

Third, the protective film 11 is aligned with the screen 13. This step includes these substeps as follows:

(1) The protective film 11 is absorbed and moved by a vacuum absorber 30. The vacuum absorber 30 has at least one suction member 31. The vacuum absorber 30 is turned on, and the suction member 31 is moved to the base layer 111 of the protective film 11 until the protective film 11 is absorbed on the suction member 31. In this way, the protective film 31 can be moved without being scraped and contaminated.

Figure 4:
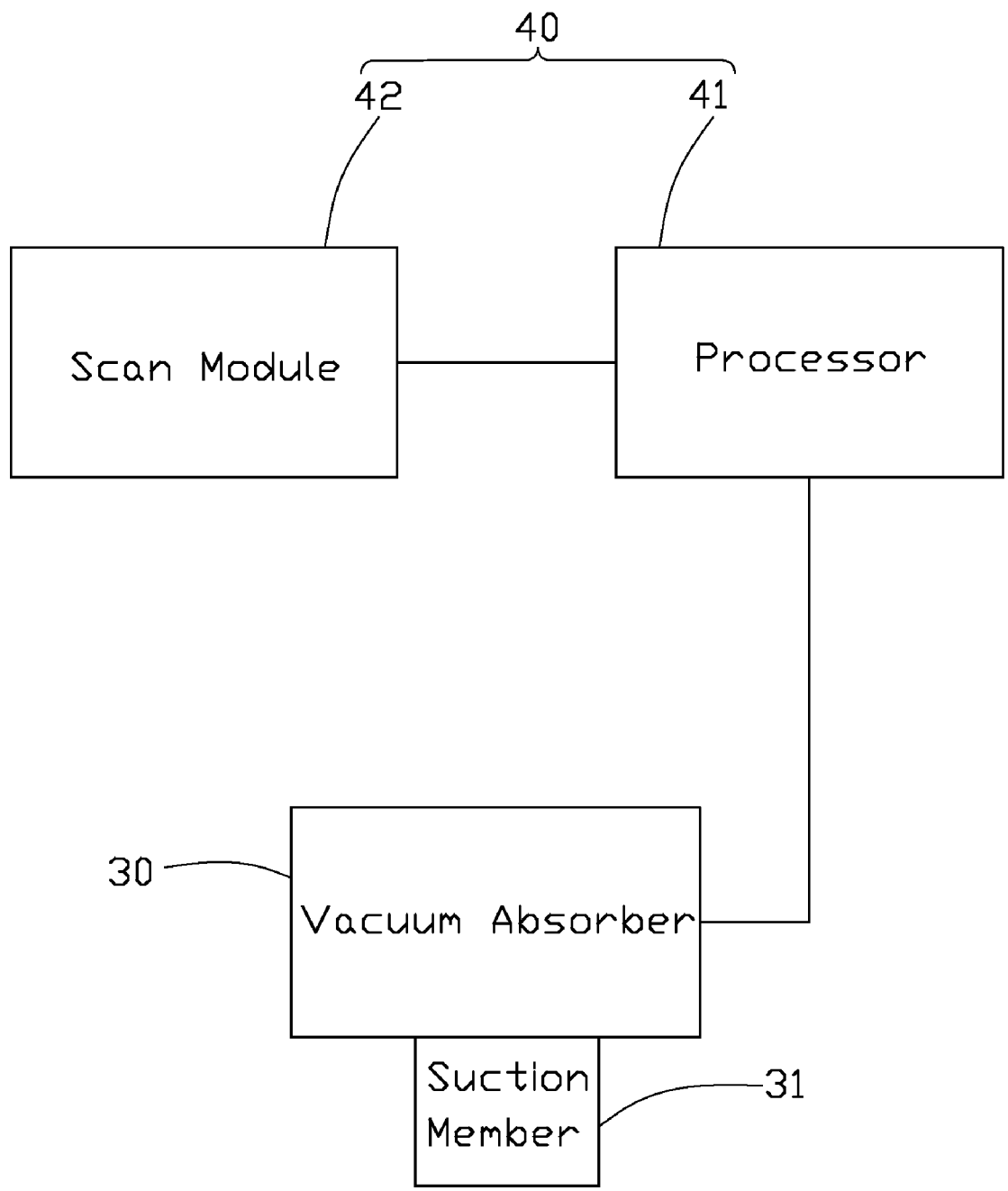
FIG. 4 is a diagram of a vacuum absorber and an adjusting apparatus used in accordance with the method of the present embodiment.

(2) The protective film 11 is aligned with the screen 13 contained in the recess 21. Also referring to FIG. 4, an adjusting apparatus 40 is used to adjust the position of the protective film 11. The adjusting apparatus 40 includes a processor 41 controlling the vacuum absorber 30 and a scan module 42 electronically connected to the processor 41. The position of the protective film 11 and the screen 13 is defined by its coordinates. The scan module 42 scans both the absorbed protective film 11 and the held screen 13 with laser to obtain the positions of the absorbed protective film 11 and the held screen 13. The processor 41 compares the differences in coordinates of the protective film 11 and the screen 13. Thus, the difference between the position of the protective film 11 and the screen 13 is calculated and stored in the processor 41. The processor 41 then controls the vacuum absorber 30 to move the suction member 31 according to the calculated difference between the positions of the protective film 11 and the screen 13. In this way, the absorbed protective film 11 is accurately aligned with the screen 13.

Fourth, the protective film 11 is mounted on the screen 13. The protective film is placed onto the screen 13 and the gluing layer 112 of the protective film 11 is kept in tight contact with the screen 13. Next, the vacuum absorber 30 is turned off, thus the protective film 11 adheres to the screen 13. The protective film 11 is then equably pressed towards the screens 13 by typical tools (not shown), such as a grinding wheel, and the gluing layer 112 glues the protective film 11 to the screen 13. Finally, the protective film 11 is mounted on the screen 13.

Additionally, the protective film 11 can be heated for improving liquidity and gluing strength of the gluing layer 112 when the protective film 11 is being pressed/mounted on the screen 13. A proper heating temperature is about 30° C.-50° C. A proper heating time is about 5-10 minutes.

Understandably, compared to the aforementioned typical method, the method of the present embodiment can omit the step of cutting the protective film 11 after mounting the protective film 11 on the screen 13. In this way, the mounted protective film 11 is prevented from being wrinkled by the shearing force caused in the cutting step. Since none of the portion of the protective film 11 is cut off, the total area of the protective film 11 can be decreased, and the producing cost is also decreased It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A method for mounting a protective film on a screen, comprising these steps:

providing a protective film and a screen having shape and area approximately equal to that of the protective film;

holding the screen;

aligning the protective film with the screen, wherein this step includes absorbing and moving the protective film with a vacuum absorber, using laser scanning to obtain coordinates describing positions of the protective film and the screen, calculating difference between the position of the protective film and the position of the screen according to the coordinates, and aligning the absorbed protective film with the screen according to the calculating result; and mounting the protective film on the screen.

2. The method as claimed in claim 1, wherein the step of holding the screen includes these substeps:

(1) providing a fixture containing a recess corresponding to the screen; and (2) engaging the screen in the recess.

3. The method as claimed in claim 1, wherein the step of mounting the protective film on the screen includes these substeps:

(1) placing the protective film onto the screen; and (2) equably pressing the protective film towards the screens.

4. The method as claimed in claim 1, further comprising the step of heating the protective film simultaneously with the step of mounting the protective film on the screen.

5. The method as claimed in claim 4, wherein the heating temperature of the step of heating the protective film is 30° C.-50° C.

6. The method as claimed in claim 4, wherein the heating time of the step of heating the protective film is 5-10 minutes.

7. The method as claimed in claim 1, wherein the protective film includes a base layer, and a gluing layer spread on the base layer and kept in tight contact with the screen.

8. The method as claimed in claim 7, wherein the base layer is made of polyethylene terephthalate (PET).

9. The method as claimed in claim 7, wherein the gluing layer is made of acrylate.

* * * * *